July 27, 1954  B. R. AREOLA  2,684,548
IMITATION CHRISTMAS TREE
Filed Feb. 27, 1953
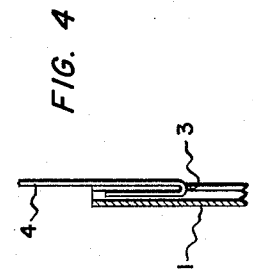
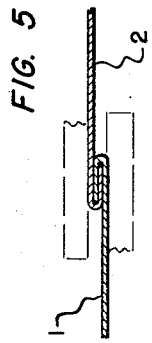
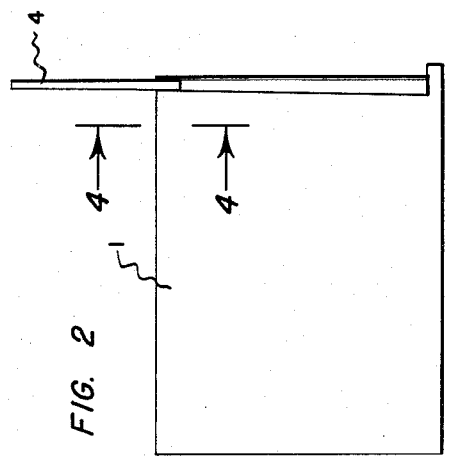
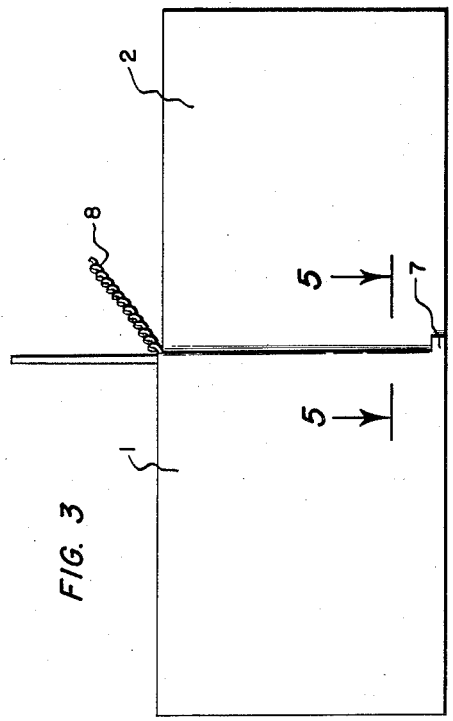
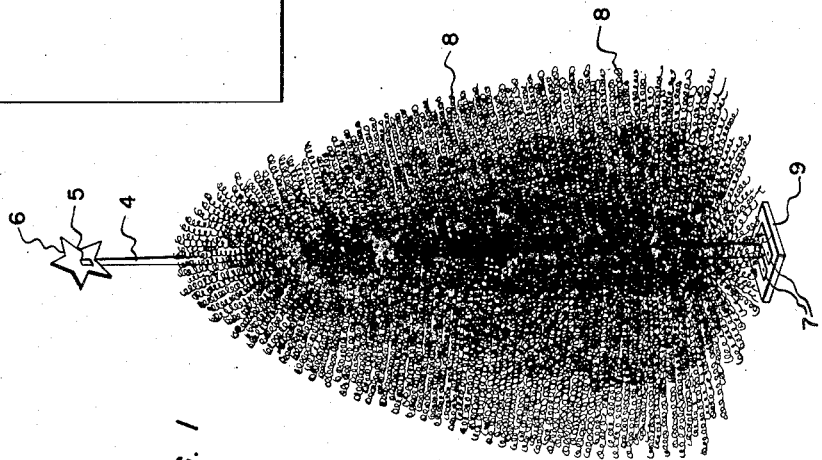
INVENTOR.
BENIGNO R. AREOLA
BY
A. B. Bowman
ATTORNEY Patented July 27, 1954

2,684,548

UNITED STATES PATENT OFFICE 2,684,548

IMITATION CHRISTMAS TREE

Benigno R. Areola, La Jolla, Calif.

Application February 27, 1953, Serial No. 339,318

2 Claims. (Cl. 41—15)

My invention relates to an imitation Christmas tree, more particularly to a tree in the form of a Christmas tree, that is made from thin sheet tin and so sheared and arranged to form a tree imitation resembling the Christmas tree, and the objects of my invention are:

First, to provide an imitation Christmas tree made entirely of sheet metal in the form of sheet tin and having a shape likeness resembling a Christmas tree.

Second, to provide an imitation Christmas tree of this class in which all of the limbs are in spiral form, some of which are extended but still remain spiral to properly form the tree like imitation.

Third, to provide an imitation tree of this class that is cut from two rectangularly shaped pieces of tin which are folded together to form the body of the tree.

Fourth, to provide an imitation tree of this class in which the means for securing it on a supporting block are integral with the sheet tin used for shearing in forming the tree limbs.

Fifth, to provide a tree of this class with an interlocked central portion extending upwardly from the central portion of the tree to form a support for a star.

Sixth, to provide a novel method for forming an imitation Christmas tree out of thin sheet tin.

Seventh, to provide an imitation Christmas tree of this class which provides a glistening surface to the body and limbs of the tree throughout, and which remains in this glistening condition after use year after year, and Eighth, to provide a Christmas tree of this class which is very simple and economical to make, easy to install in position for use, easy to attach ornaments thereon, and which will not readily deteriorate or get out of order.

With these and other objects in view, as will appear hereinafter, my invention consists of certain novel features of construction, combination, and arrangement of parts and portions, as will be hereinafter described in detail, and particularly set forth in the appended claims, reference being had to the accompanying drawings and to the characters of reference thereon, forming a part of this application, in which:

Figure 1 is an elevational view of my imitation Christmas tree shown ready for use and showing its support in perspective to facilitate the illustration. Fig. 2 is an elevational view of one of the sheets of tin from which my tree is sheared shown in folded form and with the star support in connection therewith. Fig. 3 is a side elevational view of both sheets in their folded connected form ready for shearing and showing one of the shearing shavings as cut from the upper edge of one of the sheets. Fig. 4 is a partial sectional elevational view taken from a line 4—4 of Fig. 2, and Fig. 5 is an enlarged sectional view taken from the line 5—5 of Fig. 3 and showing by dash line the position of the sheets when turned for forming the support for the butt of the tree.

Similar characters of reference refer to similar parts and portions throughout the several views of the drawings.

The material from which my imitation Christmas tree is made consists of two thin sheets of tin 1 and 2, which are interlocked and folded in close overlapped relation to each other, as shown best in Fig. 5 of the drawings, it being noted that the folded portion is tapered, being wider at the lower side and considerably narrower at the upper side to form a tapered body and also to help in the shaping of the tree from the rectangularly shaped sheets. The sheet 1 is provided with a slot 3 near its upper side shown best in Fig. 4, adapted to receive the lower end portion of the star support 4, which star support 4 is folded at its lower end and extends through the slot 3 and the folded end portion extends upwardly to near the top edge of the member 1 and provides a substantial support for the extended star support 4 which is tapered being narrower at its upper end and is made of substantially the same sheet tin material. The extended upper end of this member 4 is extended through a hole 5 in the star 6 and folded down against the star on the opposite side from the main portion of this member 4, substantially supporting the star in position, above the top of the tree centrally thereof. The limbs of the tree are then formed by shearing narrow slices from the tin beginning at the upper edge and extending downwardly until completed on both sides forming spirals as shown at 8 in Figs. 1 and 3 of the drawings.

These spirals are then arranged so that the upper ends extend upwardly to nearly vertical position while some of the lower ones are stretched longitudinally, leaving some longer and some shorter, as shown in Fig. 1 of the drawings. Some are stretched more than others, but all remain in spiral elongated form as sheared from the metal. The shearing of the narrow slices causes the spiral form.

It is to be noted that before the shearing is complete to the bottom of both of the sheets 1 and 2, the extended portion which is not folded in the folds of the members are extended portions designated 7, and they are folded down at right angles to the main portion of the sheet to form the member 7 which are nailed to a rectangular block 9 on the opposite sides of the body formed by the folded portion of the members 1 and 2 as shown best in Fig. 1 of the drawings, thus providing a substantial support for the tree at the butt.

It will be noted that the spiral form of these limbs, some being longer and some shorter in their arranged relation, provide a uniform shaped imitation Christmas tree and these spiral forms at their ends provide a substantial means for supporting various ornaments and lights for the tree.

Though I have shown and described a particular construction, combination, and arrangement of parts and portions, I do not wish to be limited to this particular construction, combination, and arrangement but desire to include in the scope of my invention the construction, combination, and arrangement substantially as set forth in the appended claims.

Having thus described my invention, what I claim as new, and desire to secure by Letters Patent is:

1. An imitation Christmas tree, consisting of the combination of a tree trunk formed of two folded interlocked thin sheets, integral spiral limbs extending from each folded sheet consisting of close spirals formed by shearing thin strips from the sheets forming elongated spirals arranged so that their extremities form a tree form, the side edges of said trunk converging upwardly toward the top and a thin sheet metal star holding member extending centrally from the top of said trunk and secured at its lower end in the fold of said sheets member forming said trunk, said sheets provided with extended portions arranged for folding to provide securing means for said trunk.

2. An imitation Christmas tree, consisting of the combination of a tree trunk formed of two folded interlocked thin sheets, integral spiral limbs extending from each folded sheet consisting of close spirals formed by shearing thin strips from the sheets forming elongated spirals arranged so that their extremities form a tree form, the side edges of said trunk converging upwardly toward the top, a thin sheet metal star holding member extending centrally from the top of said trunk and secured at its lower end in the fold of said sheets member forming said trunk, said sheets provided with extended portions arranged for folding to provide securing means for said trunk, and a block member on which said securing member is mounted and secured.

References Cited in the file of this patent

UNITED STATES PATENTS

| Number | Name | Date |
|---|---|---|
| 835,478 | Sjobring | Nov. 6, 1906 |
| 1,190,759 | Harrington | July 11, 1916 |
| 2,226,349 | Royle | Dec. 24, 1940 |
| 2,651,130 | Stratmann | Sept. 8, 1953 |